US011480048B2

(12) United States Patent
Al-Malki et al.

(10) Patent No.: US 11,480,048 B2
(45) Date of Patent: Oct. 25, 2022

(54) SEISMIC-WHILE-DRILLING SYSTEMS AND METHODOLOGY FOR COLLECTING SUBSURFACE FORMATION DATA

(71) Applicant: Saudi Arabian Oil Company, Dhahran (SA)

(72) Inventors: Bandar S. Al-Malki, Dammam (SA); Mohammed T. Al-Mojbel, Khobar (SA); Ismail A. Adebiyi, Dhahran (SA); Mohammed Y. Al-Daif, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 62 days.

(21) Appl. No.: 17/023,791

(22) Filed: Sep. 17, 2020

(65) Prior Publication Data

US 2022/0082010 A1 Mar. 17, 2022

(51) Int. Cl.
  *E21B 47/01* (2012.01)
  *E21B 47/13* (2012.01)
  (Continued)

(52) U.S. Cl.
  CPC .............. *E21B 47/01* (2013.01); *E21B 47/13* (2020.05); *G01V 1/247* (2013.01); *G01V 1/306* (2013.01)

(58) Field of Classification Search
  CPC .......... E21B 47/01; E21B 47/13; E21B 47/14; E21B 47/0224; E21B 47/00; E21B 49/00; G01V 1/247; G01V 1/306
  See application file for complete search history.

(56) References Cited

U.S. PATENT DOCUMENTS 7,398,837 B2  7/2008  Hall et al.
7,710,822 B2  5/2010  Harmon
(Continued)

FOREIGN PATENT DOCUMENTS

CN        104563859 A      4/2015
WO   WO-2009146548 A1 * 12/2009 ......... E21B 47/0224

OTHER PUBLICATIONS

International Search Report and Written Opinion dated Jun. 9, 2021 pertaining to International application No. PCT/US2021/013871 filed Jan. 19, 2021, 15 pages.

*Primary Examiner* — Caroline N Butcher
(74) *Attorney, Agent, or Firm* — Dinsmore & Shohl LLP

(57) ABSTRACT

A system for collecting subsurface formation data in a petroleum exploration environment includes a drilling tool and a subsurface formation data hub. A drilling tool may include drill pipe, a geophone, a drilling hammer, and a drill bit. The subsurface formation data hub may comprise a seismic data processor and a user interface. The seismic data processor may be operable to drive the drilling hammer at a frequency and an energy, synchronize the geophone to sense seismic vibration at a frequency, and determine subsurface formation properties. The user interface may be operable to display subsurface formation data. A method of collecting subsurface formation data in a petroleum exploration environment may include defining a drilling hammer frequency and energy, synchronizing a geophone to sense seismic vibration at a frequency, generating an impact in the petroleum exploration environment, receiving a returning seismic vibration at the geophone, and collecting subsurface formation data.

10 Claims, 3 Drawing Sheets

(51) Int. Cl.
  *G01V 1/24* (2006.01)
  *G01V 1/30* (2006.01)

(56) References Cited

U.S. PATENT DOCUMENTS

| | | |
|---|---|---|
| 8,902,700 B2 | 12/2014 | Muytzert et al. |
| 2006/0044940 A1 | 3/2006 | Hall et al. |
| 2006/0077757 A1* | 4/2006 | Cox .................. G01V 1/40 367/25 |
| 2006/0203614 A1 | 9/2006 | Harmon |
| 2011/0290485 A1* | 12/2011 | Cooke, Jr. ............ E21B 33/14 166/286 |
| 2014/0169127 A1 | 6/2014 | Orban |
| 2014/0169129 A1 | 6/2014 | Orban |
| 2014/0362664 A1 | 12/2014 | Stolpman |
| 2015/0103625 A1* | 4/2015 | Thompson ............ G01V 1/28 367/25 |
| 2015/0300161 A1 | 10/2015 | Kamata |
| 2018/0187542 A1 | 7/2018 | Sayed et al. |

* cited by examiner

SEISMIC-WHILE-DRILLING SYSTEMS AND METHODOLOGY FOR COLLECTING SUBSURFACE FORMATION DATA

BACKGROUND

The present disclosure generally relates to drilling operations and more specifically to systems and methodology for collecting subsurface formation data.

BRIEF SUMMARY

Seismic-While-Drilling (SWD) encompasses seismic techniques used while lowering a drilling tool into a borehole, during drilling, or while connecting drill pipes. While operating in a borehole, efficiency and safety are crucial considerations. SWD may provide accurate prediction of depth to overpressure zones and accurate and safe prediction of drilling hazards, but often suffers from undue complexity. The present inventors have recognized a need for improved systems and tools for SWD to reduce drilling uncertainty.

According to one embodiment of the present disclosure, a system for collecting subsurface formation data in a petroleum exploration environment is provided and may comprise a drilling tool and a subsurface formation data hub. The drilling tool may comprise drill pipe, a geophone, a drilling hammer, and a drill bit collectively defining a length of the drilling tool. The drill bit may define a downhole end of the drilling tool. The drilling hammer may be positioned between the geophone and the drill bit along the length of the drilling tool. The subsurface formation data hub may comprise a seismic data processor and a user interface. The seismic data processor may be in communication with the geophone and the drilling hammer and may be operable to drive the drilling hammer at a frequency ranging from approximately 5 Hertz (Hz) to approximately 40 Hz and an energy ranging from approximately 100 Joules (J) to approximately 600 J. The seismic data processor may also be operable to synchronize the geophone to sense seismic vibration at a frequency ranging from approximately 5 Hz to approximately 40 Hz. The seismic data processor may also be operable to determine subsurface formation properties based on the seismic vibration received by the geophone. The user interface may be in communication with the seismic data processor and may be operable to display subsurface formation data based on the subsurface formation properties determined by the seismic data processor.

In accordance with another embodiment of the present disclosure, a method of collecting subsurface formation data in a petroleum exploration environment may comprise defining a drilling hammer frequency, synchronizing a geophone to sense seismic vibration, generating an impact in the petroleum exploration environment from the drilling hammer, receiving a returning seismic vibration from the subsurface formation at the geophone, and collecting subsurface formation data of the petroleum exploration environment by processing the seismic vibration received at the geophone. The drilling hammer frequency may range from approximately 5 Hz to approximately 40 Hz and an energy ranging from approximately 100 J to approximately 600 J. The geophone may be synchronized to sense vibration at a frequency ranging from approximately 5 Hz to approximately 40 Hz. The impact generated by the drilling hammer in the petroleum exploration environment may produce a seismic vibration in the subsurface formation.

In accordance with yet another embodiment of the present disclosure, a drilling tool may comprise a drill pipe, a geophone, a drilling hammer, and a drill bit collectively defining a length of the drilling tool. The drill bit may define a downhole end of the drilling tool. The geophone may be located along the length of the drill pipe. The drilling hammer may be positioned between the geophone and the drill bit along the length of the drilling tool. The drilling hammer may be operable to generate an impact in a petroleum exploration environment comprising a frequency ranging from approximately 5 Hz to approximately 40 Hz and an energy ranging from approximately 100 J to approximately 600 J. The geophone may be operable to sense seismic vibration at a frequency ranging from approximately 5 Hz to approximately 40 Hz. The drill bit may be operable to advance the drilling tool into the subsurface formation.

Although the concepts of the present disclosure are described herein with primary reference to a petroleum exploration environment, it is contemplated that the concepts will enjoy applicability to any drilling environment. For example, and not by way of limitation, it is contemplated that the concepts of the present disclosure will enjoy applicability to any environment where drilling into a subsurface formation is required such as, but not limited to, drilling for a foundation or drilling for any other fluid aside from petroleum.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

During drilling operations in a petroleum exploration environment, a drilling tool may advance into the ground towards underground petroleum reservoirs. As used through the present disclosure, a "petroleum exploration environment" may refer to a subsurface formation where wells are being drilled for the purpose of discovering or sourcing petroleum or other forms of hydrocarbons. As the drilling tool advances deep into the ground, it is of interest to know what lies ahead of the drilling tool prior to the drilling tool actually encountering the deeper portions of the petroleum exploration environment. For example, zones of over pressure, or relatively high pressure, ahead of the drilling tool may be detrimental for the drilling tool to intersect without knowledge of the zone. Accordingly, there is a need for a system or apparatus to collect subsurface formation data in a petroleum exploration environment prior to the drilling tool intersecting that portion of the petroleum exploration environment. As described throughout, embodiments of the present disclosure may collect subsurface formation data in a petroleum exploration environment.

Figure 1:
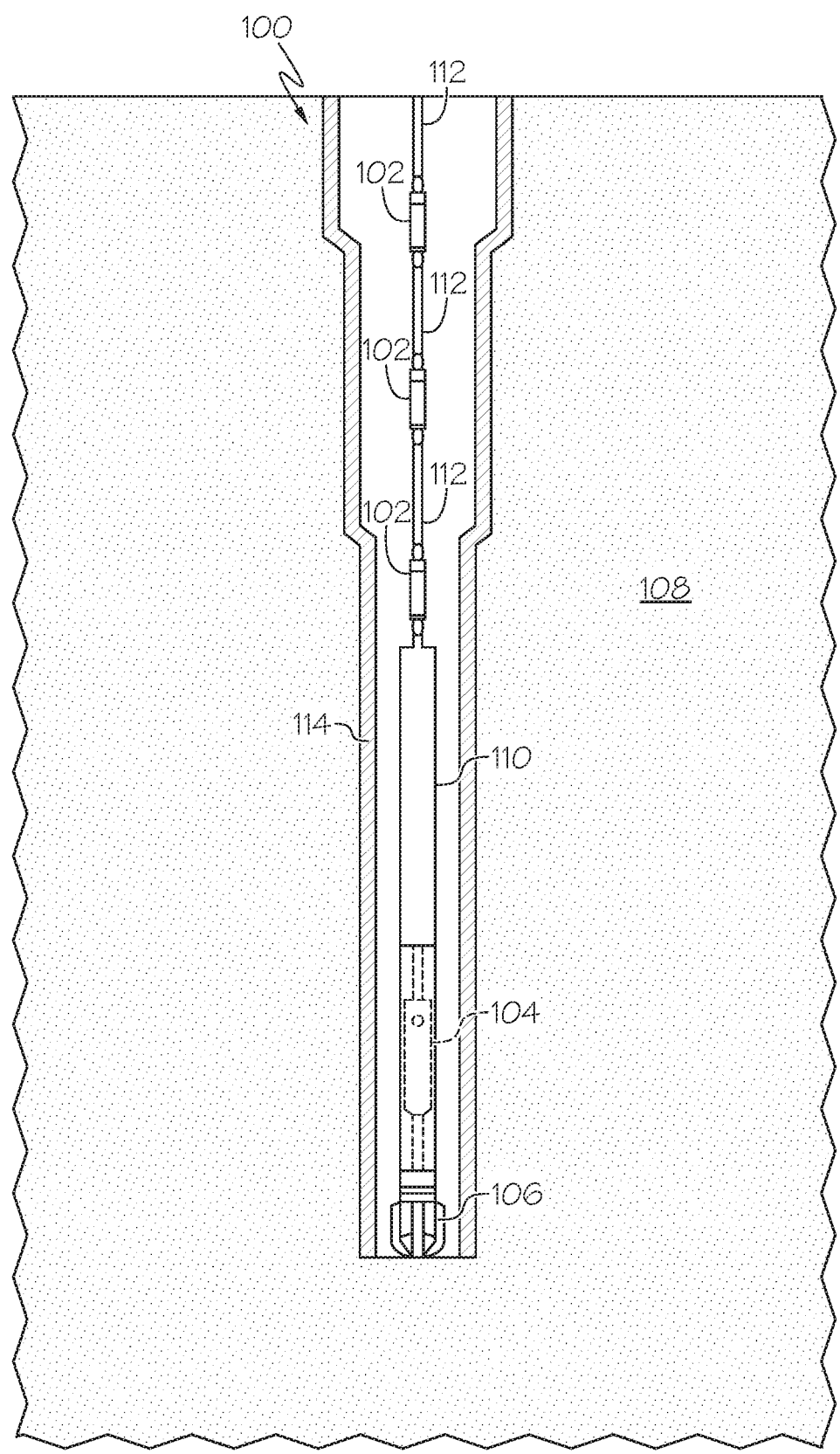
FIG. 1 schematically depicts a drilling tool in accordance with one or more embodiments of the present disclosure.
Figure 2:
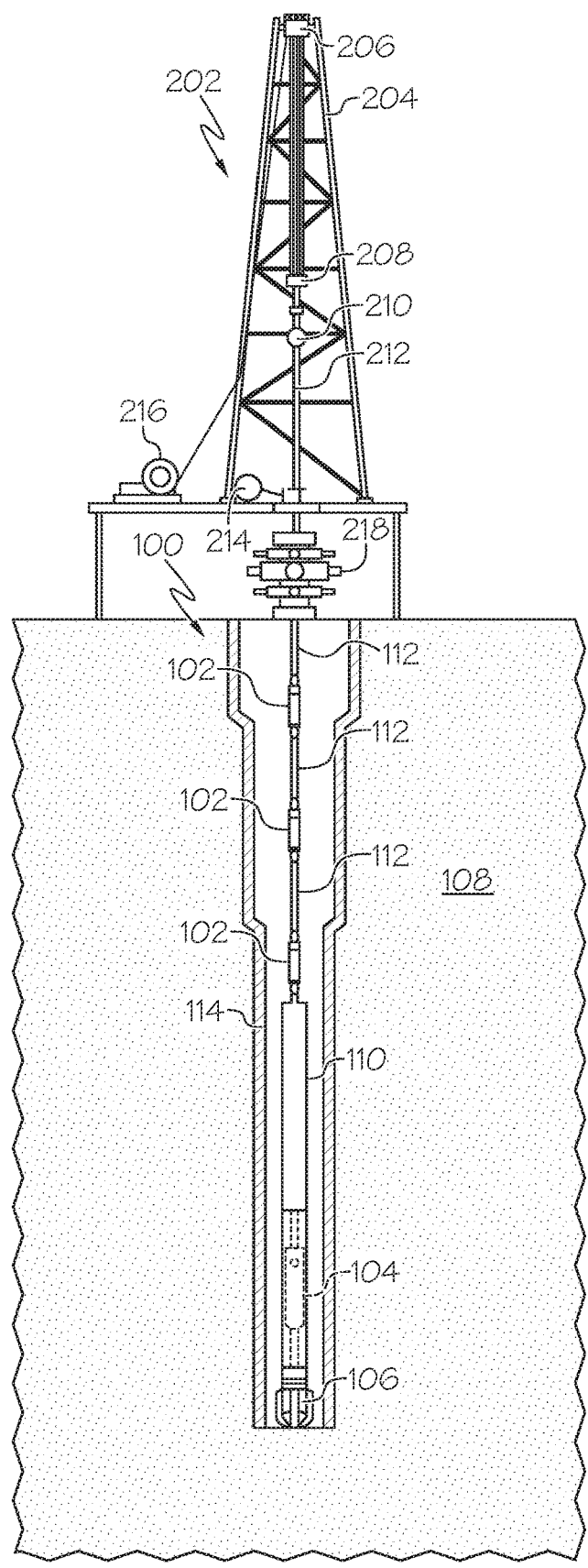
FIG. 2 schematically depicts a drilling rig and a drilling tool in accordance with one or more embodiments of the present disclosure.
Figure 3:
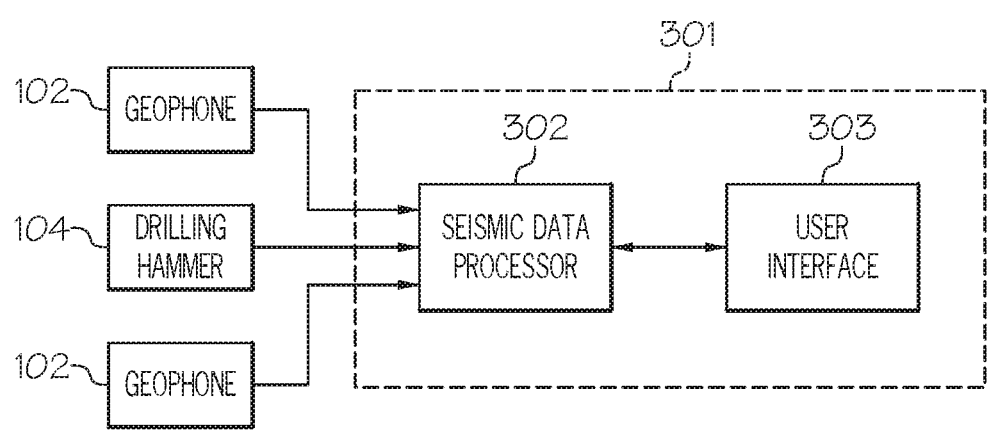
FIG. 3 schematically depicts a plurality of geophones and a subsurface formation data hub in accordance with one or more embodiments of the present disclosure.

Referring initially to FIGS. 1 to 3, a system for collecting subsurface formation data in a petroleum exploration environment is schematically depicted. The system may comprise a drilling tool 100 and a subsurface formation data hub 301. FIG. 1 is a schematic depiction detailing the drilling tool 100. FIG. 2 is a schematic depiction of the drilling tool 100 and one example of a drilling rig 202 that the drilling tool 100 may be used in conjunction with, which will be further described herein. FIG. 3 is a schematic depiction of the subsurface formation data hub 301, a plurality of geophones 102, and a drilling hammer 104. The drilling tool 100 may comprise drill pipe 112, a geophone 102, the drilling hammer 104, and a drill bit 106 collectively defining a length of the drilling tool 100. The drill bit 106 may define a downhole end of the drilling tool 100. As used throughout the present disclosure, the "downhole end of the drilling tool" may refer to the part of the drilling tool 100 that has advanced the furthest into the petroleum exploration environment. The drilling hammer 104 may be positioned between the geophone 102 and the drill bit 106 along the length of the drilling tool 100.

Referring to FIG. 3, the subsurface formation data hub 301 may comprise seismic data processor 302 and a user interface 303. The seismic data processor 302 may be in communication with the geophone 102 and the drilling hammer 104. The seismic data processor 302 may be operable to: drive the drilling hammer 104 at a frequency ranging from approximately 5 Hz to approximately 40 Hz and an energy ranging from approximately 100 J to approximately 600 J, synchronize the geophone 102 to sense seismic vibration at a frequency ranging from approximately 5 Hz to approximately 40 Hz, and determine subsurface formation 108 properties based on the seismic vibration received by the geophone 102. The user interface 303 may be in communication with the seismic data processor 302 and may be operable to display subsurface formation 108 data based on the subsurface formation 108 properties determined by the seismic data processor 302.

Referring to FIGS. 1 and 2, the geophone 102 may be positioned on the exterior of the drill pipe 112. The geophone 102 is a device that may detect ground velocity produced by seismic waves and transform the motion into electrical impulses. In embodiments, the geophone 102 may comprise three mutually orthogonal geophones 102 in combination to collect 3C seismic data. 3C seismic data is a type of multicomponent seismic data acquired in a land, marine, or borehole environment by using three orthogonally oriented geophones. One having ordinary skill in the art will recognize and understand 3C seismic data. It is contemplated that any conventional or yet to be designed geophone 102 may be used in the embodiments of the present disclosure. The geophone 102 may be positioned approximately 10 meters to approximately 250 meters above the drilling hammer 104. It is contemplated that the geophone 102 may be placed as close as possible to the drilling hammer 104, but that the geophone 102 will still be above a bottom hole assembly. In some embodiments, a gas well bottom hole assembly may be approximately 100 meters to 150 meters.

Still referring to FIGS. 1 and 2, in embodiments, the drilling tool 100 may comprise a plurality of geophones 102 spaced along the length of the drilling tool 100 above the drilling hammer 104. The drilling hammer 104 may be positioned approximately 10 meters to approximately 250 meters from a closest one of the plurality of geophones 102. In embodiments, the drilling hammer 104 may be positioned approximately 100 meters to approximately 150 from a closest one of the plurality of geophones 102. The drilling hammer 104 may be positioned within approximately 300 meters of a closest one of the plurality of geophones 102. In embodiments, the drilling hammer 104 may be positioned within approximately 100 meters or 150 meters of a closest one of the plurality of geophones 102. The plurality of geophones 102 may be positioned from approximately 100 meters to approximately 150 meters above the drilling hammer 104.

With reference to FIG. 3, the seismic data processor 302 may be in communication with the plurality of geophones 102 and may be operable to determine subsurface formation 108 properties based on the seismic vibration received by the plurality of geophones 102. Individual ones of the plurality of geophones 102 may be individually operable to relay distinct subsurface formation 108 data corresponding to individual subsurface formation 108 properties of the petroleum exploration environment to the processor. The individual subsurface formation 108 properties may comprise subsurface formation 108 type, subsurface formation 108 porosity, subsurface formation 108 permeability, subsurface formation 108 mobility, or combinations of these. The data recorded by the geophone 102 or plurality of geophones 102 may be analyzed by the seismic data processor 302. The seismic data processor 302 may match the data recorded by the geophone 102 or plurality of geophones 102 to available field seismic data. By matching the observed data recorded by the geophone 102 or plurality of geophones 102 with available field seismic data, the seismic data processor 302 may determine subsurface formation 108 properties. The seismic data processor may better determine depth control and subsurface formation 108 top prognosis.

Again referring to FIGS. 1 and 2, the drilling tool 100 may comprise a downhole end geophone 102 positioned between the drilling hammer 104 and the drill bit 106. The seismic data processor 301 may be in communication with the geophone 102 above the drilling hammer and the downhole end geophone 102 between the drilling hammer and the drill bit. The seismic data processor 301 may be operable to determine subsurface formation 108 properties based on the seismic vibration received by the geophone 102 above the drilling hammer 104 and the downhole end geophone 102 between the drilling hammer 104 and the drill bit 106.

The drilling tool 100 may comprise a plurality of sections of drill pipe 112 comprising coupling sections where the sections of drill pipe 112 may be coupled together. In embodiments, each section of drill pipe 112 may comprise two ends, where a first end has a male adapter and the second end has a female adapter. The female adapter may serve as a receptacle that receives and holds the male adapter. For example, the male adapter may comprise male threads (i.e., threads on the outside of the drill pipe section), whereas the female adapter may comprise female threads (i.e., threads on the inside of the drill pipe section). The male threads and the female threads may be complimentary such that the male threads of one section of drill pipe 112 may be screwed into the female threads of a second section of drill pipe 112, effectively coupling the two sections of drill pipe 112 together. In embodiments, the plurality of geophones 102 may be positioned at a plurality of the coupling sections. In some embodiments, one geophone 102 may be positioned at a coupling section. In other embodiments, more than one geophone 102 may be positioned at a coupling section. In yet other embodiments, a plurality of geophones 102 may be individually positioned at a plurality of coupling sections. In still other embodiments, one geophone 102 may be positioned at some coupling sections and more than one geophone 102 may be positioned at other coupling sections.

Still referring to FIGS. 1 and 2, in embodiments, the drill pipe 112 may further comprise a drill collar 110 at the downhole end of the drill pipe 112. The drill collar 110 may be operable to provide additional weight on the drilling hammer 104 and drill bit 106. The additional weight on the drilling hammer 104 and drill bit 106 may help advance the drill bit 106 into the subsurface formation 108. In embodiments, the drill pipe 112 may further comprise heavyweight drill pipe between the drill pipe 112 and the drill collar 110.

The drilling hammer 104 may comprise an air hammer, a hydro hammer, or a mud hammer. It is contemplated that any conventional or yet to be designed drilling hammer 104 may be used in the embodiments of the present disclosure. Thus, any conventional or yet to be designed air hammer, hydro hammer, or mud hammer may be used in the embodiments of the present disclosure. The drilling hammer 104 may comprise an internal piston 105 along a longitudinal axis of the drilling hammer 104. The internal piston 105 may be operable to deliver an impact to the subsurface formation 108. The seismic data processor 302 may be operable to drive the drilling hammer 104 at a frequency ranging from approximately 5 Hz to approximately 40 Hz. The seismic data processor 302 may be operable to drive the drilling hammer 104 at an energy ranging from approximately 100 J to approximately 600 J.

In embodiments, the seismic data processor 302 may be operable to drive the drilling hammer 104 at a frequency ranging from approximately 5 Hz to approximately 35 Hz, from approximately 5 Hz to approximately 30 Hz, from approximately 5 Hz to approximately 25 Hz, from approximately 5 Hz to approximately 20 Hz, from approximately 5 Hz to approximately 15 Hz, from approximately 5 Hz to approximately 10 Hz, from approximately 10 Hz to approximately 40 Hz, from approximately 10 Hz to approximately 35 Hz, from approximately 10 Hz to approximately 30 Hz, from approximately 10 Hz to approximately 25 Hz, from approximately 10 Hz to approximately 20 Hz, from approximately 10 Hz to approximately 15 Hz, from approximately 15 Hz to approximately 40 Hz, from approximately 15 Hz to approximately 35 Hz, from approximately 15 Hz to approximately 30 Hz, from approximately 15 Hz to approximately 25 Hz, from approximately 15 Hz to approximately 20 Hz, from approximately 20 Hz to approximately 40 Hz, from approximately 20 Hz to approximately 35 Hz, from approximately 20 Hz to approximately 30 Hz, or from approximately 20 Hz to approximately 25 Hz.

In embodiments, the seismic data processor 302 may be operable to drive the drilling hammer 104 at an energy ranging from approximately 100 J to approximately 500 J, from approximately 100 J to approximately 400 J, from approximately 100 J to approximately 300 J, from approximately 100 J to approximately 200 J, from approximately 250 J to approximately 500 J, from approximately 250 J to approximately 450 J, from approximately 200 J to approximately 500 J, from approximately 200 J to approximately 450 J, from approximately 200 J to approximately 400 J, from approximately 200 J to approximately 300 J, from approximately 300 J to approximately 500 J, or from approximately 300 J to approximately 400 J.

Still referring to FIGS. 1 and 2, the drill bit 106 may be any conventional or yet to be designed drill bit 106. The specific drill bit 106 used may be selected based on the subsurface formation 108 and what type of bit is best compatible with that specific subsurface formation 108. One having ordinary skill in the art will appreciate that different drill bits 106 may be preferred in different subsurface formations 108. In embodiments, the drill bit 106 may comprise a polycrystalline diamond compact bit. Together, the drill bit 106 and the drilling hammer 104 may collectively define the downhole end of the drilling tool 100. The drilling hammer 104 may be coupled directly to the drill bit 106, without any intervening drill pipe 112. However, it is contemplated that, in embodiments, there may be an intervening component, such as intervening drill pipe 112, drill collar 110, or heavyweight drill pipe, between the drilling hammer 104 and the drill bit 106.

Referring to FIG. 2, one embodiment of a drilling rig 202 is schematically depicted. It should be noted that other drilling rigs 202 are contemplated and that the drilling rig 202 in FIG. 2 is simply illustrative of how the drilling tool 100 according to embodiments of the present disclosure may be used in conjunction with a drilling rig 202. The drilling rig 202 may comprise a derrick 204. The derrick 204 is a structure, typically pyramidal in shape, used to support a crown block 206 and the drilling tool 100 of a drilling rig 202. The crown block 206 is a fixed set of pulleys (called sheaves) positioned at the top of the derrick 204, over which a drilling line may be threaded. The companion block to the crown block 206 is the traveling block 208. The traveling block 208 is the movable set of pulleys that may move up and down the derrick 204. The drilling line may be threaded from the crown block 206, through the traveling block 208, and back to the crown block 206. As one having ordinary skill in the art will appreciate, there are numerous ways to arrange the drilling line between the crown block 206 and the traveling block 208. However, the arrangement of the drilling line is not crucial to the drilling tool 100. A swivel 210 may hang directly underneath the traveling block 208 and may allow the drilling tool 100 to rotate while allowing the traveling block 208 to remain stationary. Additionally, the swivel 210 may be connected to the kelly 212, which may allow for various drilling fluids to be pumped into the drilling tool 100. Further, the drilling rig 202 may include a rotary drive 214. The rotary drive 214 may be positioned on the derrick 204 and around the drilling tool 100 and may provide rotational force to the drilling tool 100 to facilitate the process of drilling. The drilling rig 202 may also include a draw works 216, which is the primary hoisting machinery of the drilling rig 202. The draw works 216 may be positioned on the derrick 204 and may be connected to the drilling tool 100. The draw works 216 may be operable to hoist and lower the traveling block 206 and, in turn, the drilling tool 100. Finally, the drilling rig 200 may include a blowout preventer 218. The blowout preventer 218 may be a large valve or series of valves below the derrick 204 and above the subsurface formation 108 that may be used to seal, control, and monitor during drilling operation to prevent a blowout. A blowout may refer to an uncontrolled release of fluid from a well.

Again referring to FIGS. 1 and 2, a method of collecting subsurface formation 108 data in the petroleum exploration environment may comprise defining the drilling hammer 104 frequency and energy, synchronizing the geophone 102 to sense seismic vibration, generating an impact in the petroleum exploration environment from the drilling hammer 104, wherein the impact may produce a seismic vibration in the subsurface formation 108, receiving a returning seismic vibration from the subsurface formation 108 at the geophone 102, and collecting subsurface formation 108 data of the petroleum exploration environment. As previously described, the drilling hammer 104 frequency may range from approximately 5 Hz to approximately 40 Hz and the energy may range from approximately 100 J to approximately 600 J. Similarly, the geophone 102 may be synchronized to sense seismic vibration at a frequency ranging from approximately 5 Hz to approximately 40 Hz.

As previously described, the drilling hammer 104 frequency may range from approximately 5 Hz to approximately 40 Hz and the geophone 102 may be synchronized to sense seismic vibration at a frequency ranging from approximately 5 Hz to approximately 40 Hz. In embodiments, the geophone 102 may be synchronized to sense seismic vibration at a frequency equal to the defined drilling hammer 104 frequency. For example, if the drilling hammer 104 frequency is approximately 18 Hz, the geophone 102 may be synchronized to sense seismic vibration at a frequency of 18 Hz.

The method may further comprise relaying subsurface formation 108 data of the petroleum exploration environment from the geophone 102 to the user interface 303. Again, as previously described, a plurality of geophones 102 may be present and may be synchronized to sense seismic vibrations. The plurality of geophones 102 may receive returning seismic vibrations corresponding to different subsurface formation 108 data (such as subsurface formation 108 type, subsurface formation 108 porosity, subsurface formation 108 permeability, or subsurface formation 108 mobility) of the petroleum exploration environment.

While reference has been made to collecting subsurface formation 108 data while drilling in a petroleum exploration environment, it is contemplated that drilling is not required. That is, subsurface formation 108 data may be collected while drilling in the petroleum exploration environment. Alternatively, subsurface formation 108 data may be collected while drilling in the petroleum exploration environment is suspended. More specifically, drilling in the petroleum exploration environment may be suspended, and an impact in the petroleum exploration environment may still be generated in the petroleum exploration environment such that the impact still produces a seismic vibration in the subsurface formation 108. Similarly, a returning seismic vibration from the subsurface formation 108 may be received at the geophone 102 while drilling in the petroleum exploration environment is suspended.

Referring to FIG. 1, one embodiment of a drilling tool 100 is schematically depicted. As previously discussed with respect to one embodiment of a system for collecting subsurface formation 108 data in a petroleum exploration environment, the drilling tool 100 may comprise the drill pipe 112, the geophone 102, the drilling hammer 104, and the drill bit 106 collectively defining the length of the drilling tool 100. The drill bit 106 may define the downhole end of the drilling tool 100. The geophone 102 may be located along the length of the drill pipe 112. The drilling hammer 104 may be positioned between the geophone 102 and the drill bit 106 along the length of the drilling tool 100. The drilling hammer 104 may be operable to generate an impact in a petroleum exploration environment comprising a frequency ranging from approximately 5 Hz to approximately 40 Hz and an energy ranging from approximately 100 J to approximately 600 J. The geophone 102 may be operable to sense seismic vibration at a frequency ranging from approximately 5 Hz to approximately 40 Hz. The drill bit 106 may be operable to advance the drilling tool 100 into the subsurface formation 108. Other features of the drilling tool 100 may be substantially similar to those previously discussed with regard to the system for collecting subsurface formation 108 data in the petroleum exploration environment.

One or more aspects of the present disclosure are described herein. A first aspect may include a system for collecting subsurface formation data in a petroleum exploration environment, the system comprising a drilling tool and a subsurface formation data hub, wherein: the drilling tool comprises drill pipe, a geophone, a drilling hammer, and a drill bit collectively defining a length of the drilling tool; the drill bit defines a downhole end of the drilling tool; the drilling hammer is positioned between the geophone and the drill bit along the length of the drilling tool; the subsurface formation data hub comprises a seismic data processor and a user interface; the seismic data processor is in communication with the geophone and the drilling hammer and is operable to drive the drilling hammer at a frequency ranging from approximately 5 Hz to approximately 40 Hz and an energy ranging from approximately 100 J to approximately 600 J, synchronize the geophone to sense seismic vibration at a frequency ranging from approximately 5 Hz to approximately 40 Hz, and determine subsurface formation properties based on the seismic vibration received by the geophone; and the user interface is in communication with the seismic data processor and is operable to display subsurface formation data based on the subsurface formation properties determined by the seismic data processor.

A second aspect may include a drilling tool comprising: a drill pipe, a geophone, a drilling hammer, and a drill bit collectively defining a length of the drilling tool, wherein: the drill bit defines a downhole end of the drilling tool; the geophone is located along the length of the drill pipe; the drilling hammer is positioned between the geophone and the drill bit along the length of the drilling tool; the drilling hammer is operable to generate an impact in a petroleum exploration environment comprising a frequency ranging from approximately 5 Hz to approximately 40 Hz and an energy ranging from approximately 100 J to approximately 600 J; the geophone is operable to sense seismic vibration at a frequency ranging from approximately 5 Hz to approximately 40 Hz; and the drill bit is operable to advance the drilling tool into the subsurface formation.

A third aspect may include either the first or the second aspect, wherein the geophone is positioned approximately 10 meters to approximately 250 meters above the drilling hammer.

A fourth aspect may include any of the first through third aspects, wherein the drilling tool comprises a plurality of geophones spaced along the length of the drilling tool above the drilling hammer and the drilling hammer is positioned approximately 10 meters to approximately 250 meters from a closest one of the plurality of geophones.

A fifth aspect may include any one of the first through fourth aspects, wherein the drilling tool comprises a plurality of geophones spaced along the length of the drilling tool above the drilling hammer; and the seismic data processor is in communication with the plurality of geophones and is operable to determine subsurface formation properties based on the seismic vibration received by the plurality of geophones.

A sixth aspect may include the fifth aspect, wherein individual ones of the plurality of geophones are individually operable to relay distinct subsurface formation data corresponding to individual subsurface formation properties of the petroleum exploration environment to the processor.

A seventh aspect may include the fifth aspect, wherein the drilling hammer is positioned approximately 10 meters to approximately 250 meters from a closest one of the plurality of geophones.

An eighth aspect may include the fifth aspect, wherein the drilling hammer is positioned within approximately 300 meters of a closest one of the plurality of geophones.

A ninth aspect may include any one of the first through eighth aspects, wherein the plurality of geophones are positioned from approximately 100 meters to approximately 150 meters above the drilling hammer.

A tenth aspect may include any one of the first through ninth aspects, wherein: the drilling tool comprises a downhole end geophone positioned between the drilling hammer and the drill bit; and the seismic data processor is in communication with the geophone above the drilling hammer and the downhole end geophone between the drilling hammer and the drill bit and is operable to determine subsurface formation properties based on the seismic vibration received by the geophone above the drilling hammer and the downhole end geophone between the drilling hammer and the drill bit.

An eleventh aspect may include any one of the first through tenth aspects, wherein the geophone is positioned on the exterior of the drill pipe.

A twelfth aspect may include any one of the first through eleventh aspects, wherein: the drilling tool comprises a plurality of sections of drill pipe comprising coupling sections where the drill pipe sections are coupled together; and the plurality of geophones are positioned at a plurality of the coupling sections.

A thirteenth aspect may include the twelfth aspect, wherein: the drilling tool further comprises a drill collar at the downhole end of the drill pipe; and the drill collar is operable to provide additional weight on the drilling hammer and drill bit.

A fourteenth aspect may include any one of the first through thirteenth aspects, wherein the individual subsurface formation properties comprise subsurface formation type, subsurface formation porosity, subsurface formation permeability, subsurface formation mobility, or combinations of these.

A fifteenth aspect may include any one of the first through fourteenth aspects, wherein the drilling hammer comprises an air hammer, a hydro hammer, or a mud hammer.

A sixteenth aspect may include any one of the first through fifteenth aspects, wherein: the drilling hammer comprises an internal piston along a longitudinal axis of the drilling hammer; and the internal piston is operable to deliver an impact to the subsurface formation.

A seventeenth aspect may include any one of the first through sixteenth aspects, wherein the seismic data processor is operable to drive the drilling hammer at a frequency ranging from approximately 15 Hz to approximately 20 Hz.

An eighteenth aspect may include any one of the first through seventeenth aspects, wherein the seismic data processor is operable to drive the drilling hammer at an energy ranging from approximately 250 J to approximately 450 J.

A nineteenth aspect may include any one of the first through eighteenth aspects, wherein the drill bit comprises a polycrystalline diamond compact bit.

A twentieth aspect may include any one of the first through nineteenth aspects, wherein the drill bit and the drilling hammer collectively define the downhole end of the drilling tool.

A twenty-first aspect may include any one of the first through twentieth aspects, wherein the drilling hammer is coupled directly to the drill bit, without any intervening drill pipe.

A twenty-second aspect may include a method of collecting subsurface formation data in a petroleum exploration environment, the method comprising: defining a drilling hammer frequency ranging from approximately 5 Hz to approximately 40 Hz and an energy ranging from approximately 100 J to approximately 600 J; synchronizing a geophone to sense seismic vibration at a frequency ranging from approximately 5 Hz to approximately 40 Hz; generating an impact in the petroleum exploration environment from the drilling hammer, wherein the impact produces a seismic vibration in a subsurface formation; receiving a returning seismic vibration from the subsurface formation at the geophone; and collecting subsurface formation data of the petroleum exploration environment by processing the seismic vibration received at the geophone.

A twenty-third aspect may include the twenty-second aspect, wherein the geophone is synchronized to sense seismic vibration at a frequency equal to the defined drilling hammer frequency.

A twenty-fourth aspect may include either the twenty-second aspect or the twenty-third aspect, further comprising relaying subsurface formation data of the petroleum exploration environment from the geophone to a user interface.

A twenty-fifth aspect may include any of the twenty-second through twenty-fourth aspects, wherein a plurality of geophones receive returning seismic vibrations corresponding to different subsurface formation data of the petroleum exploration environment.

A twenty-sixth aspect may include any of the twenty-second through twenty-fifth aspects, wherein the different subsurface formation data comprise subsurface formation type, subsurface formation porosity, subsurface formation permeability, subsurface formation mobility, or combinations of these.

A twenty-seventh aspect may include any of the twenty-second through twenty-sixth aspects, wherein subsurface formation data is collected while drilling in the petroleum exploration environment.

A twenty-eighth aspect may include any of the twenty-second through twenty-seventh aspects, wherein subsurface formation data is collected while drilling in the petroleum exploration environment is suspended.

It is also noted that recitations herein of "a plurality" of any one component, element, etc., should not be used to create an inference that the alternative use of the articles "a" or "an" should be limited to a single component, element, etc.

It is noted that the term "typically," when utilized herein, is not utilized to limit the scope of the claimed invention or to imply that certain features are critical, essential, or even important to the structure or function of the claimed invention. Rather, this term is merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of collecting subsurface formation data in a petroleum exploration environment utilizing a drilling tool and a subsurface formation data hub, the drilling tool comprising drill pipe, a plurality of geophones, a drilling hammer, and a drill bit, and the subsurface formation data hub comprising a seismic data processor in communication with the plurality of geophones, the method comprising:

advancing the drill bit into the subsurface formation to drill the subsurface formation, wherein the drilling hammer is positioned between the plurality of geophones and the drill bit along the length of the drilling tool, within approximately 10 meters to approximately 250 meters of a closest one of the plurality of geophones, the plurality of geophones, the drilling hammer, and the drill bit collectively define a length of the drilling tool, and the plurality of geophones are spaced along the length of the drilling tool above the drilling hammer at a plurality of coupling sections of the drill pipe; and ranging a drilling hammer frequency from approximately 5 Hz to approximately 40 Hz, and a drilling hammer energy from approximately 100 J to approximately 600 J, while the drill bit advances into the subsurface formation;

generating an impact in the petroleum exploration environment from the drilling hammer, wherein the impact produces a seismic vibration in a subsurface formation;

synchronizing the plurality of geophones to the ranging drilling hammer frequency to sense returning seismic vibration from the subsurface formation at a frequency equal to the ranging drilling hammer frequency while the drill bit advances into the subsurface formation; and utilizing the seismic data processor to match the returning seismic vibrations sensed by the plurality geophones to available field seismic data to determine subsurface formation data of the petroleum exploration environment.

2. The method of claim 1, further comprising displaying the subsurface formation data at a user interface, wherein the user interface is in communication with the seismic data processor and is operable to display the seismic formation data.

3. The method of claim 1, wherein individual ones of the plurality of geophones are individually operable to relay distinct subsurface formation data corresponding to individual subsurface formation properties of the petroleum exploration environment to the processor.

4. The method of claim 1, wherein the drilling hammer is positioned within approximately 100 meters to approximately 150 meters of a closest one of the plurality of geophones.

5. The method of claim 1, wherein the drill bit defines a downhole end of the drilling tool.

6. The method of claim 1, wherein the plurality of geophones are positioned on the exterior of the drill pipe.

7. The method of claim 1, wherein the drilling hammer comprises a hydro hammer.

8. The method of claim 1, wherein the drilling hammer frequency is ranged from approximately 15 Hz to approximately 20 Hz.

9. The method of claim 1, wherein the drilling hammer energy is ranged from approximately 250 J to approximately 450 J.

10. The method of claim 1, wherein the drilling hammer is coupled directly to the drill bit, without any intervening drill pipe.

* * * * *